United States Patent [19]

Kramers

[11] 4,397,664
[45] Aug. 9, 1983

[54] DEVICE FOR SUPPLYING COOLING AIR UNDER PRESSURE

[75] Inventor: Pieter Kramers, Amersfoort, Netherlands

[73] Assignee: Bronswerk B.V., Netherlands

[21] Appl. No.: 349,904

[22] Filed: Feb. 18, 1982

[30] Foreign Application Priority Data

Feb. 23, 1981 [NL] Netherlands ........................ 8100878

[51] Int. Cl.$^3$ .......................... F25B 39/04; H05K 7/20
[52] U.S. Cl. ........................................ 62/183; 62/335; 62/172; 361/384
[58] Field of Search ....................... 62/228 R, 172, 183, 62/335; 361/383, 384; 174/15 R

[56] References Cited

U.S. PATENT DOCUMENTS

| 2,959,028 | 11/1960 | Beggs ..................................... 62/172 |
| 3,102,399 | 9/1963 | Meckler ............................ 62/335 X |
| 4,144,723 | 3/1979 | Morse et al. ....................... 62/335 X |

Primary Examiner—William E. Wayner
Attorney, Agent, or Firm—Kane, Dalsimer, Kane, Sullivan and Kurucz

[57] ABSTRACT

A device for supplying cooling air under pressure, e.g. for cooling the electric apparatus in an aeroplane at rest on the ground, comprising an internal combustion motor, such as a diesel motor, an air compressor having its suction line connected to the atmosphere, the pressure side of this air compressor supplying air under pressure; and a cooling circuit for cooling this air under pressure, said cooling circuit including a compressor, a condenser and a cooler. A cooler with air-cooling is operative between the air compressor and the said cooler in the cooling circuit, while actuating means, which reacts to the temperature of the atmosphere switches the compressor in the cooling circuit on and off when the temperature of the atmosphere rises or falls to a predetermined value.

8 Claims, 1 Drawing Figure

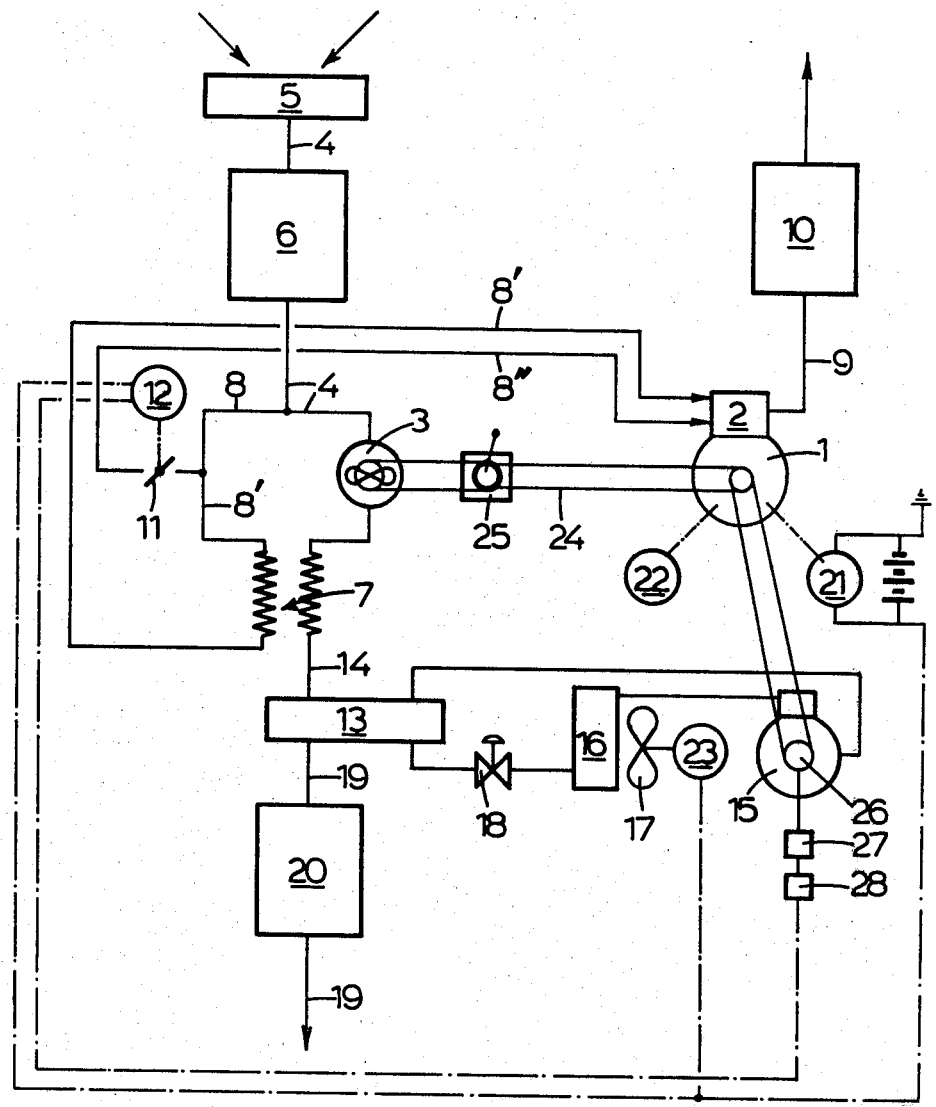

DEVICE FOR SUPPLYING COOLING AIR UNDER PRESSURE

BACKGROUND OF THE INVENTION

The invention relates to a device for supplying cooling air under pressure, e.g. for cooling the electric apparatus in an aeroplane at rest on the ground, comprising an internal combustion motor, such as a diesel motor; an air compressor having its suction line connected to the atmosphere, the pressure side of this air compressor supplying air under pressure; a cooling circuit for cooling this air under pressure, said cooling circuit including a compressor, a condenser and a cooler.

In a known device for cooling the electric apparatus of an aeroplane which is at rest on the ground outside air is compressed by means of an air compressor, whereafter this air under pressure functions as the cooling air. However, the air is increased in temperature in the air compressor, which increase amounts e.g. to approximately 30° C. As the cooling air should have a temperature which is e.g. below 26° C. for the object in view, the air under pressure supplied by the air compressor has to be cooled unless the temperature of the outside air is very low, viz. lower than −4° C. in case of an increase of the temperature in the air compressor of approximately 30° C. Generally, freon is used as the circulating medium in the cooling circuit.

This known device has the disadvantage that the cooler of the cooling circuit has to have a very large capacity and consumes much energy, the more so as this cooler has to be switched on practically continuously. As large differences in the temperature of the outside air occur a complicated control apparatus is required, which again consumes much energy.

SUMMARY OF THE INVENTION

It is an object of the present invention to provide a device of the type mentioned hereinabove, wherein these objections are removed in an effective way.

To this end the device for supplying cooling air under pressure is characterized by a cooler with air-cooling which is operative between the air compressor and the said cooler in the cooling circuit; and actuating means, which reacts to the temperature of the atmosphere and which switches the compressor in the cooling circuit on and off when the temperature of the atmosphere rises or falls to a predetermined value.

According to the invention only the cooler with air-cooling is in operation when the temperature of the outside air is rather low, e.g. between −4° C. until 18° C., so that in that period the cooler which forms part of the cooling circuit is not in operation. Only when the temperature of the outside air reaches a predetermined value, e.g. 18° C., the compressor in the cooling circuit will be switched on, so that the cooler in this cooling circuit operates as a second cooling step. In this manner it is possible that the cooler in the cooling circuit has only a rather small capacity, whilst this cooler is furthermore only periodically in operation, so that the energy necessary for the device is favourably influenced. Furthermore, the control range of the cooler in the cooling circuit is relatively small, so that a simple control apparatus will suffice.

In a device according to the invention, wherein the internal combustion motor is provided with a suction ventilator for supplying cooling air to the motor, the suction line of this suction ventilator being connected to the atmosphere, it is of great advantage when the outside air sucked by said suction ventilator is at least partially used as the cooling medium for the cooler with air-cooling.

In this manner the device may be simplified to a great extent, whilst its reliability is increased.

According to a preferred embodiment of the device according to the invention the suction line of the suction ventilator branches in a conduit portion, which passes the cooler with air-cooling and in a short circuit conduit, which directly connects the suction ventilator to the atmosphere, a valve being mounted in this short circuit conduit, which is controlled by a control means which reacts to the temperature of the atmosphere.

In this manner it is possible to automatically reduce or increase the quantity of outside air functioning as cooling fluid and passing per unit of time through the cooler with air-cooling in dependency of the temperature of the outside air.

In the known device a diesel motor drives a generator, which supplies the electric current for the electric motors for driving the air compressor and the compressor of the cooling circuit.

A very important simplification of the device according to the invention is obtained when the air compressor is mechanically driven by the internal combustion motor.

Furthermore the compressor in the cooling circuit may be mechanically driven by the internal combustion motor through a drive means.

In that case the drive means of the compressor in the cooling circuit may comprise an electromagnetic coupling, which is switched on and off by said actuating means which reacts to the temperature of the atmosphere.

BRIEF DESCRIPTION OF THE DRAWING

The invention will hereinafter be elucidated with reference to the drawing, which schematically shows an embodiment of a device according to the invention for supplying cooling air under pressure for cooling the electric apparatus of an aeroplane which is at rest on the ground.

DESCRIPTION OF A PREFERRED EMBODIMENT

This displaceable device comprises a diesel motor 1, which is provided with a suction ventilator 2, which supplies the cooling air for the diesel motor 1.

This diesel motor 1 drives an air compressor 3 through a V-belt transmission 24 and an acceleration drive 25. The suction side of this air compressor 3 is connected to the atmosphere through a suction line 4. An air filter 5 and a silencer 6 are included in this suction line 4.

The pressure side of the air compressor 3 supplies air under pressure which has to be cooled before being fed as cooling air to the aeroplane.

The cooling system for cooling the air under pressure supplied by the air compressor 3 includes a cooler 7 with air-cooling.

Outside air is used as a cooling medium for the cooler 7, which outside air passes the first portion of the suction line 4 and therefore the air filter 5 and the silencer 6, but which thereafter follows a branch line 8 connected to the suction line 4 upstream of the air compressor 3. This first portion of the suction line 4 is connected to the suction side of the suction ventilator 2 of the diesel motor 1. This branch line 8 branches in a conduit portion 8' which passes the cooler 7 with air-cooling and in a short circuit conduit 8", which leads directly to the suction ventilator 2 without passing the cooler 7.

The outside air in the conduit portion 8' serves as a cooling medium for the air under pressure, which is heated in the air compressor 3. Thereafter the air in the conduit portion 8' reaches the suction ventilator 2 and functions as a cooling medium for the diesel motor 1. Hereupon this air is discharged through the discharge line 9, wherein a silencer 10 is inserted.

A valve 11 in the short circuit conduit 8" is adjustable by means of a servomotor 12.

If the outside air has a temperature which is of such height, that the cooler 7 with air-cooling is not capable to cool the air delivered by the air compressor 3 and increased in temperature to such extent that the temperature required for cooling the electric apparatus in the aeroplane is obtained, a cooler 13 in a cooling circuit with e.g. freon as the circulating fluid, becomes operative. This cooler 13 is mounted downstream of the cooler 7 with air-cooling and is connected thereto by a conduit 14.

The cooling circuit comprises the cooler 13, a compressor 15 which is mechanically driven by the diesal motor 1, a condensor 16 with a fan 17 and an expansion valve 18.

A silencer 20 is included in the conduit 19, which connects the cooler 13 to the aeroplane.

In the drawing the diesel motor 1 further drives a 24 Volt generator 21, which serves for loading the accumulators for driving the starting motor 22 of the diesel motor 1. This generator 21 further supplies the electric current for the regulating and auxiliary apparatus such as the servomotor 12 for the valve 11 in the short circuit conduit 8" and the electric motor 23 for the fan 17.

As an alternative it is also possible that the diesel motor 1 drives two generators, viz. one 24 Volt generator which serves for loading the accumulators for starting the diesel motor 1 and a second generator providing electric current of another voltage for the regulating and auxiliary apparatus.

The operation of the device for supplying cooling air under pressure for cooling the electric apparatus in an aeroplane at rest on the ground is as follows:

When the temperature of the outside air is below a certain predetermined value, e.g. 18° C., only the cooler 7 with air-cooling is in use, while the cooler 13 is not in operation as the compressor 15 in the cooling circuit is switched off.

For this purpose the drive of the compressor 15 by the diesel motor 1 includes an electromagnetic coupling 26, which is switched on and off by an actuating means 27, which reacts to the temperature of the atmosphere and which includes a thermostat 28, the electromagnetic coupling 26 being only switched on when the outside air is warmer than the predetermined value.

The servomotor 12 is controlled by the thermostat 28 as well and will displace the valve 11 further towards the closed position when the temperature of the outside air increases. This leads to the effect that more outside air acts as the cooling medium for the cooler 7 with air-cooling and passes this cooler 7, so that the cooling capacity of the cooler 7 increases.

When the outside air is warmer than the predetermined temperature, the electromagnetic coupling 26 will be switched on by the actuating means 27, whereafter the compressor 15 will be driven by the diesel motor 1 and the cooler 13 will become operative. Hereafter the cooler 7 with air-cooling and the cooler 13 in the cooling circuit simultaneously bring the cooling air flowing to the aeroplane on the desired cooling temperature.

The control of the pressure of the cooling air and/or the quantity of cooling air per unit of time may take place by adjusting the velocity of the diesel motor 1 and thus of the air compressor 3.

The device for supplying air under pressure for cooling the electric apparatus in an aeroplane at rest on the ground has the important advantage that the cooler 13 in the cooling circuit may be of relatively small dimensions. Further the whole construction of the device according to the invention is extremely simple due to the fact that the suction ventilator 2 of the diesel motor 1 delivers the cooling medium for the cooler 7 with air-cooling.

The invention is not restricted to the embodiment shown in the drawing by way of example, which may be varied in several ways within the scope of the appended claims.

It is e.g. possible that the device supplies cooling air under pressure for other purposes than cooling the electric apparatus in an aeroplane at rest on the ground.

I claim:

1. A device for supplying cooling air under pressure, e.g. for cooling the electric apparatus in an aeroplane at rest on the ground, comprising an internal combustion motor, such as a diesel motor; an air compressor having its suction line connected to the atmosphere, the pressure side of this air compressor supplying air under pressure; a cooling circuit for cooling this air under pressure, said cooling circuit including a compressor, a condenser and a cooler; a cooler with air-cooling which is operative between the air compressor and the said cooler in the cooling circuit; and actuating means, which reacts to the temperature of the atmosphere and which switches the compressor in the cooling circuit on and off when the temperature of the atmosphere rises or falls to a predetermined value.

2. A device according to claim 1, wherein the internal combustion motor is provided with a suction ventilator for supplying cooling air to the motor, the suction line of this suction ventilator being connected to the atmosphere, while the outside air sucked by said suction ventilator is at least partially used as the cooling medium for the cooler with air-cooling.

3. A device according to claim 2, wherein the suction line of the suction ventilator branches in a conduit portion, which passes the cooler with air-cooling and in a short circuit conduit, which directly connects the suction ventilator to the atmosphere, a valve being mounted in this short circuit conduit, which is controlled by a control means which reacts to the temperature of the atmosphere.

4. A device according to claim 3, wherein the air compressor is mechanically driven by the internal combustion motor.

5. A device according to claim 4, wherein the compressor in the cooling circuit is mechanically driven by the internal combustion motor through a drive means.

6. A device according to claim 5, wherein the drive means of the compressor in the cooling circuit comprises an electromagnetic coupling, which is switched on and off by said actuating means which reacts to the temperature of the atmosphere.

7. A device according to claim 6, wherein the suction line of the suction ventilator and the suction line of the air compressor have a common initial portion, which branches upstream of the air compressor.

8. A device according to claim 7, wherein the internal combustion motor drives a generator means, which loads accumulators for starting the internal combustion motor and which further provides the electric current for regulating and auxiliary apparatus.

* * * * *